United States Patent [19]

Mizuguchi et al.

[11] Patent Number: 5,603,757
[45] Date of Patent: Feb. 18, 1997

[54] PHOTOCHROMIC BRIGHTENING PIGMENT

[75] Inventors: Katsumi Mizuguchi, Neyagawa; Naoya Yabuuchi, Toyonaka; Keizou Ishii, Ashiya, all of Japan

[73] Assignee: Nippon Paint Co., Ltd., Osaka, Japan

[21] Appl. No.: 412,081

[22] Filed: Mar. 14, 1995

[30] Foreign Application Priority Data

Mar. 18, 1994 [JP] Japan .................................. 6-049344

[51] Int. Cl.$^6$ ........................................ C09C 1/62
[52] U.S. Cl. ..................... 106/404; 106/403; 106/417; 106/418; 106/437; 427/407.1
[58] Field of Search .............................. 106/404, 417, 106/418, 403, 437; 427/407.1

[56] References Cited

FOREIGN PATENT DOCUMENTS

| 52-36525 | 9/1977 | Japan . |
| 58-141248 | 2/1982 | Japan . |
| 62-253668 | 8/1986 | Japan . |

*Primary Examiner*—Mark L. Bell
*Assistant Examiner*—Scott L. Hertzog
*Attorney, Agent, or Firm*—Townsend & Banta

[57] ABSTRACT

A photochromic brightening pigment comprises a brightening pigment and a photochromic material which is encapsulated so as to adhere it to the surface of the brightening pigment.

13 Claims, No Drawings

PHOTOCHROMIC BRIGHTENING PIGMENT

BACKGROUND OF THE INVENTION

1. Field of the Invention

The present invention relates to a novel brightening pigment having a photochromic property and a coating composition containing the same.

2. Description of the Background Art

In general, brightening pigments such as an aluminum flake pigment, a nickel pigment and mica are well known as pigments providing metallic and pearly glosses. It is possible to obtain metallic and interference pearl color tones by mixing such brightening pigments into coatings, for example. In relation to metallic pigments such as an aluminum flake pigment, known are methods of covering surfaces thereof with resin for dyeing the same or improving water resistance etc. (Japanese Patent Laid-Open Nos. 52-36525 (1977), 58-141248 (1983) and 62-253668 (1987)).

On the other hand, a photochromic material is known as a material which changes its color upon irradiation with light.

In general, however, there has been developed no pigment having the photochromic property which is provided in such a photochromic material as well as an interference pearl effect or a metallic effect.

SUMMARY OF THE INVENTION

An object of the present invention is to provide a photochromic brightening pigment which can provide new designing, which has conventionally been impossible to attain.

The inventive photochromic brightening pigment comprises a brightening pigment and a photochromic material which is encapsulated to adhere to the surface of the brightening pigment. Preferably, the inventive photochromic brightening pigment further comprises at least one of an ultraviolet absorbent and an antioxidant adhering to the surface of the brightening pigment by encapsulation, in addition to the photochromic material.

In a preferred mode of the present invention, the photochromic brightening pigment comprises a brightening pigment, a resin paste, containing a photochromic material which is dissolved or dispersed therein, mixed with the brightening pigment, and a capsule wall film for encapsulating the mixture of the brightening pigment and the resin paste, and more preferably, the photochromic brightening pigment further comprises at least one of an ultraviolet absorbent and an antioxidant which is mixed into the resin paste.

A method of preparing a photochromic brightening pigment according to the present invention comprises the steps of preparing a resin paste containing a photochromic material which is dissolved or dispersed therein, mixing the resin paste with a brightening pigment, and encapsulating the mixture. In a preferred mode of the present invention, the mixing step includes a step of mixing the resin paste, the brightening pigment and at least one of an ultraviolet absorbent and an antioxidant.

According to the present invention, the photochromic material can be selected from generally employed photochromic materials including organic compounds such as azobenzenes, spiropyrans, spirooxazines, phenothiazines, phenozines, bianthrones, anils, metal dithizonates, viologen, indigo, fulgide, tetrabenzopentacene and stilbene, and inorganics such as silver halide and sodalite.

According to the present invention, further, the brightening pigment can be selected from those generally known as brightening pigments such as an aluminum flake pigment, nickel, mica, mica coated with titanium oxide, and mica coated with iron oxide.

In the present invention, the photochromic material can be encapsulated by a chemical or physical method which is generally known as a method of encapsulation.

The chemical method can be selected from interfacial polymerization, in situ polymerization, submerged curing method and the like.

The interfacial polymerization, which is adapted to encapsulate the target through interfacial reaction by employing hydrophobic and hydrophilic monomers, can be selected from interfacial polycondensation and interfacial polyaddition, for example.

The interfacial polycondensation is adapted to form a capsule wall of a polyester polymer or a polyamide polymer by polycondensation reaction between polybasic acid halides and polyamines or polyols such as polyhydric alcohols or polyhydric phenols.

Examples of the polyamine are diamines such as ethylenediamine, phenylenediamine, toluenediamine and hexamethylenediamine, triamines such as diethylenetriamine, 1,3,5-benzenetriamine, 1,3,6-triaminonaphthalene and melamine, and polyfunctional amines such as polyethyleneimine and tetraethylenepentamine.

The polyol can be prepared from diol, triol or polyfunctional alcohol. Examples of the diol are ethylene glycol, neopentyl glycol, propylene glycol, 1,3-butylene glycol, 1,6-hexanediol, diethylene glycol, dipropylene glycol, triethylene glycol, bisphenol A hydride, bisphenol dihydroxypropyl ether, hydroquinone and resorcinol.

Examples of the triol are glycerine, trimethylolethane and trimethylolpropane.

Examples of the polyfunctional alcohol are pentaerythritol, dipentaerythritol, tetrahydroxyanthracene and phenolic resins.

Examples of the polybasic acid halide are azelaoyl chloride, adipoyl chloride, terephthaloyl chloride, sebacoyl chloride, dodecanediolic acid chloride, bifunctional acid chlorides such as benzensulfonyl dichloride, and polyfunctional acid chlorides such as benzenetetracid chloride, trimezoyl chloride and benzenetrisulfonyl chloride.

The interfacial polyaddition is adapted to form a capsule wall of a polyurea polymer or a polyurethane polymer through polyaddition reaction between polyisocyanate and polyamine or polyol.

The polyamine and the polyalcohol can be prepared from the aforementioned examples.

Examples of the polyisocyanate are bifunctional isocyanates and polyfunctional isocyanates. The bifunctional isocyanates include aliphatic, aromatic and aliphatic+aromatic diisocyanates.

Examples of the aliphatic diisocyante are hexamethylene diisocyanate (HDI), lysine diisocyanate, trimethylhexamethylene diisocyante, dimeric acid diisocyante, 4,4'-methylenebis(cyclohexyl isocyanate) (MDI), xylylene diisocyanate (XDI), methaxylene diisocyanate (MXDI) and tetramethylxylylene diisocyanate (TMXDI).

Examples of the aromatic diisocyanate are tolylene diisocyanate (TDI) and 4,4'-diphenylmethane diisocyanate.

An example of the aliphatic+aromatic diisocyanate is isophorone diisocyanate (IPDI).

Examples of the polyfunctional isocyanates are aliphatic polyfunctional isocyanate which is a polymer of HDI, and aromatic polyfunctional isocyanate which is a trimer of TDI.

The in situ polymerization is adapted to encapsulate the target by supplying a monomer and a polymerization catalyst from the interior of core material or the external phase.

Examples of the monomer employed in the in situ polymerization are acrylic esters such as isopropyl acrylate, butyl acrylate, hexyl acrylate, lauryl acrylate, acrylic acid, 2-hydroxyethyl acrylate and acrylamide, methacrylic esters such as methyl methacrylate, isobutyl methacrylate, hexyl methacrylate, methacrylic acid, 2-hydroxypropyl methacrylate and glycidyl methacrylate, styrene, vinyl acetate, and acrylonitrile. It is also possible to employ a monomer having at least two polymeric groups which is obtained by esterifying a compound having at least two hydroxyl groups and acrylic acid or methacrylic acid. Examples of such a monomer are glycol dimethacrylate and neopentylglycol dimethacrylate.

The polymerization catalyst is selected from peroxides and azo compounds. Examples of the peroxides are hydrophobic peroxides such as benzoyl peroxide, parachlorobenzoyl peroxide, lauroyl peroxide and t-butylperbenzoate and hydrophilic peroxides such as potassium persulfate and ammonium persulfate, and examples of the azo compounds are hydrophobic azo compounds such as azobisisobutylonitrile, 2,2'-azobis(2-methylbutylonitrile) and 2,2'-azobis(2,4-dimethylvaleronitrile) and hydrophilic azo compounds such as 4,4'-azobis(4-cyanovaleric acid) and 2,2'-azobis(2-methylpropionamidine), which are employed independently or in a combination of at least two such materials.

The submerged curing method is adapted to encapsulate the core material with a coating film material and to thereafter curing the coating film in the curing liquid.

Exemplary combinations of the coating film material and a curing agent employed in the submerged curing method are sodium alginate and calcium chloride or acid, polyvinyl alcohol and borax, polyvinyl alcohol and formalin or hydrochloric acid, gelatin and zirconium nitrate, egg albumin and thermal coagulation (method), and epoxy resin and boron tetrafluoride.

Exemplary methods of physically preparing microcapsular particles are coacervation and submerged drying.

The coacervation is adapted to phase-separate a dissolved polymer on the surface of the core material as a concentrated phase by environmental change for forming a capsule wall film. In a water medium, for example, it is possible to control dissolution or deposition by mixing gum arabic with gelatin and regulating the pH value of the solution thereby controlling formation of the capsule wall film. In a nonaqueous system, on the other hand, it is possible to control dissolution or deposition by preparing a solution by a good solvent for dissolving a polymer, gradually adding a non-solvent allowing no dissolution of the polymer and adjusting the polarity of the medium. For example, coacervation of polystyrene can be carried out by adding ethanol to a benzene solution of polystyrene.

The submerged drying is adapted to form a capsule wall film by dispersing a wall film material solution containing a core material which is emulsified or dispersed therein in the water or a nonaqueous medium and thereafter stirring and evaporating the solvent dissolving the wall film material by heating and/or pressure reduction.

In general, it is possible to make to adhere the encapsulated photochromic material to the surface of the brightening pigment by a method of preparing microcapsules in the presence of the brightening pigment. When the photochromic material is encapsulated by interfacial polymerization, for example, it is possible to prepare capsular particles of the photochromic material adhering to the surface of the brightening pigment by dispersing a mixture consisting of the brightening pigment and a hydrophobic monomer (e.g., diisocyanate) which can form a capsule wall in the water with a proper dispersion medium and adding a hydrophilic monomer (e.g., polyamine) which can form the capsule wall with the hydrophilic monomer for forming a capsule wall (e.g., polyurea) in an interface between oil and water phases.

Alternatively, microcapsular particles may be independently prepared and mixed with a dispersion liquid containing a brightening pigment which is dispersed therein, so that the microcapsular particles adhere to the surface of the brightening pigment. In this case, it is possible to homogeneously make to adhere the microcapsular particles to the surface of the brightening pigment by taking the surface potential of the brightening pigment and those of the microcapsular particles into consideration.

According to the present invention, it is preferable to introduce an ultraviolet absorbent and/or an antioxidant into the capsules, in order to improve weather resistance of the photochromic material.

Examples of the ultraviolet absorbent are benzophenone derivatives such as 2-hydroxy-4-methyloxybenzophenone; benzotriazole derivatives such as 2-(2'-hydroxy-5'-methylphenol)-benzotriazole; benzotriazole compounds such as 2,4-di-t-butyl phenyl-3',5'-di-t-butyl-4'-hydroxybenzoate, 2-(2-hydroxy-3,5-di-t-aminophenol)-2H-benzotriazole, 2-(2-hydroxy-3,5-di-(1,1-dimethylbenzylphenyl)-2H-benzotriazole, 2-(2'-hydroxy-5'-methylphenyl)-benzotriazole, and 2-(2-hydroxy-5-methylphenyl)-2H-benzotriazole; benzophenone compounds such as 2-hydroxy-4-dodecyloxybenzophenone; phenyloxalic anilide compounds such as N-(2-ethylphenol)-N-(2-ethoxy-5-t-butylphenyl oxalic anilide; and cyanophenyl acrylate compounds such as ethyl-2-cyano-3,3-diphenyl acrylate; which are employed independently or in a combination of at least two such materials. Exemplary ultraviolet adsorbents of benzotriazole compounds are "TINUVIN 328" and "TINUVIN 900", products by Ciba-Geigy Ltd., and "SEESORB 701" and "SEESORB 704", products by Sipro Kasei Co., Ltd., for example. An exemplary ultraviolet absorbent of benzophenone compounds is "SEESORB 103", a product by Sipro Kasei Co., Ltd..

The ultraviolet absorbent thus contained in the capsules is preferably selected in consideration of compatibility with the photochromic material.

Examples of the antioxidant are hindered phenol compounds such as pentaerythrityl-tetrakis[3-(3,5-di-t-butyl-4-hydroxyphenyl)propionate] and octadecyl-3-(3,5-di-t-butyl-4-hydroxyphenyl)propionate; hindered amine compounds such as 2-(3,5-t-butyl-4-hydroxybenzyl)-2-n-butylmalonic acid bis(1,2,2,6,6-pentamethyl-4-piperidinyl)sebacate; and sulfur-containing antioxidant such as pentaerythritoltetrakis(β-lauryl thiopropionate); which are employed independently or in a combination of at least two such materials. Exemplary antioxidants of hindered phenol compounds are "IRGANOX 1010" and "IRGANOX 1076", products by Ciba-Geigy Ltd. Exemplary antioxidants of hindered amine compounds are "TINUVIN 144" and "TINUVIN 123", products by Ciba-Geigy, Ltd. and "SANOL LS-440" and "SANOL LS-292", products by Sankyo Co., Ltd. An exemplary sulfur-containing antioxidant is "SEENOX 412S", a product by Sipro Kasei Co., Ltd..

Such an antioxidant to be added into the capsules should be compatible with the photochromic material.

The photochromic brightening pigment according to the present invention can be blended into a composition containing a film forming polymer and a curing agent, for preparing a coating composition. The film forming polymer and the curing agent can be prepared from compositions which are generally known for forming paint films. Examples of the film forming polymer are acrylic resins, alkyd resins, polyester resins, polyurethane resins and amino resins. Examples of the curing agent are alkoxymethylolmelamine resins, isocyanato compounds or block isocyanato compounds, acid polyanhidrides and polyepoxy compounds. A solvent for dissolving or dispersing the polymer and the curing agent is also prepared from that for a coating. Examples of the solvent are toluene, xylene, butyl acetate, methyl acetate, methyl isobutyl ketone, butyl alcohol, aliphatic hydrocarbon and aromatic hydrocarbon. Alternatively, water may be employed as a solventless system, with no particular restriction.

In the photochromic brightening pigment according to the present invention, the ratio of the brightening pigment to the resin component forming the capsule film is preferably 100:500 to 10, more preferably 100:200 to 30. If the amount of the resin component is too large, the pigment may be deteriorated in flatness and thus lose the metallic or pearly gloss. If the amount of the resin component is too small, on the other hand, it may be impossible to form a homogeneous photochromic material layer on the surface of the pigment.

According to the present invention, the ratio of the brightening pigment to the photochromic material is preferably 100:2 to 10. The composite rate may be reduced if the amount of the photochromic material is too large, while discoloration and color change may be reduced if the amount is too small.

According to the present invention, it is possible to introduce the ultraviolet absorbent and/or the antioxidant into the microcapsules. A preferable content thereof is about 2 to 10 times that of the photochromic material. If the content of the ultraviolet absorbent and/or the antioxidant is too large, the photochromic property may be reduced, while weather resistance of the photochromic material may be reduced if the content is too small.

A method of preparing a paint film according to the present invention comprises the steps of forming a base coat film being made of a coating composition containing the inventive photochromic brightening pigment, and applying a clear coating to said base coat film to form said paint film in the manner of 2-Coat 1-Bake.

A paint film according to the present invention has a new designing property and is prepared by employing the inventive photochromic brightening pigment.

The inventive photochromic brightening pigment is prepared by encapsulating the photochromic material to adhere to the surface of the brightening pigment. Therefore, a concentrated photochromic material layer is formed around the brightening pigment in a small thickness, so that coloring change selectively takes place in the vicinity of the brightening pigment. Thus, coloring change or chrominance change is large and a metallic or pearly gloss is developed. According to the present invention, therefore, it is possible to provide a paint film exhibiting a high photochromic property which has been impossible to attain in general.

The foregoing and other objects, features, aspects and advantages of the present invention will become more apparent from the following detailed description of the present invention.

DESCRIPTION OF THE PREFERRED EMBODIMENTS

PREPARATION EXAMPLE 1

Preparation of Paste Containing Photochromic Coloring Material and Mica

540 G of polyisocyanate (TAKENATE D140NW: product by Takeda Chemical Industries, Ltd.), 120 g of ethyl acetate, 14.1 g of dimethylethanolamine, 210 g of an ultraviolet absorber (TINUVIN-123: product by Ciba-Geigy Ltd.), 180 g of butyl acetate and 42 g of a photochromic coloring material having a structure expressed in the following chemical formula (1), and the mixture was stirred through a batch-type SG bench mill (by Taihei System Co., Ltd.) at 1500 rpm for 1 hour with addition of 1 kg of 2 mm glass beads. Thereafter the glass beads were removed by filtering, and 770 g of the mixture was weighed out and stirred in a homogenizer with addition of 1 kg of mica (IRIODIN 111WII: product by Merck Co., Ltd.) and 880 g of butyl acetate, thereby preparing a pigment paste containing the coloring material and mica.

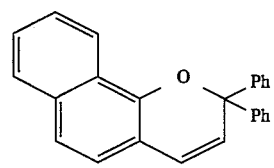

(1)

PREPARATION EXAMPLE 2

Preparation of Paste Containing Photochromic Coloring Material and Aluminum Flake 540 g of polyisocyanate (TAKENATE D140NW: product by Takeda Chemical Industries, Ltd.), 120 g of ethyl acetate, 14.4 g of dimethylethanolamine, 210 g of an ultraviolet absorber (TINUVIN-123: product by Ciba-geigy Ltd.), 180 g of butyl acetate and 42 g of a photochromic coloring material having a structure expressed in the following chemical formula (2), and the mixture was stirred through a batch-type SG bench mill (by Taihei System Co., Ltd.) at 1500 rpm for 1 hours with addition of 1 kg of 2 mm glass beads. Thereafter the glass beads were removed by filtering, and 640 g of the mixture was weighed out and stirred in a homogenizer for 1 hour with addition of 1.5 kg of an aluminum paste (3C014: product by Toyo Aluminum K.K.) and 370 9 of butyl acetate, thereby preparing a pigment paste containing the coloring material and aluminum flakes.

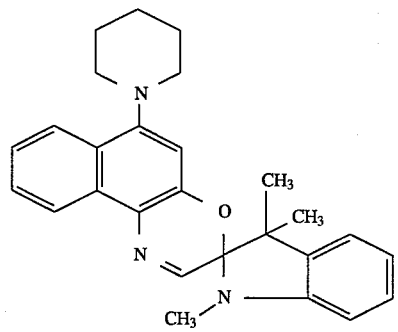

(2)

PREPARATION EXAMPLE 3

Preparation of Nonaqueous Dispersing Agent employed in Example 2

476.5 g of a silicon polymer (SILA PLANE FM-0421: product by Chisso Corporation) and 23.5 g of isophorone diisocyanate were introduced into a four-necked flask of 1 l provided with a thermometer, a stirrer, a dropping funnel and a cooling tube, heated and held at 80° C. for 8 hours, and thereafter cooled to 5° C., so that 190 g of monoamine (JEFFAMINE M-2070: product by Texaco Chemical Co., Ltd.) was dropped into the mixture by the dropping funnel over 1 hour, and thereafter the mixture was held at a temperature of 20° C. for 1 hour. The polymer as obtained had a weight average molecular weight of 8500.

PREPARATION EXAMPLE 4

Preparation of Aqueous Resin Varnish employed in Example 6

76 parts of ethylene glycol monobutyl ether was introduced into a reaction vessel of 1 l provided with a stirrer, a temperature controller and a cooling tube, and heated to a temperature of 120° C. under stirring with addition of 61 parts of a monomer solution consisting of 45 parts of styrene, 63 parts of methyl methacrylate, 48 parts of 2-hydroxyethyl methacrylate, 117 parts of n-butyl acrylate, 27 parts of methacrylic acid, 3 parts of lauryl mercaptan and 3 parts of azobisisobutylonitrile. 245 parts of the aforementioned monomer solution was dropped for 3 hours, and thereafter stirring was continued for 1 hour. Further, 28 parts of dimethylethanolamine and 200 parts of deionized water were added to the mixture to obtain a water soluble acrylic resin varnish having a non-volatile matter of 50% and a number average molecular weight of 6000.

PREPARATION EXAMPLE 5

Preparation of Capsular Particles of Photochromic Coloring Material (1)

A mixed dispersed substance consisting of 95 g of polyisocyanate (TAKENATE D140NW: product by Takeda Chemical Industries, Ltd.), 100 g of an ultraviolet absorber (TINUVIN-123: product by Ciba-Geigy, Ltd.) and 5 g of the photochromic coloring material expressed in the above chemical formula (1) was emulsified with an aqueous solution consisting of 18 g of PVA (POVAR 217EE: product by Kuraray Co., Ltd.), 2 g of PVA (POVAR 420: product by Kuraray Co., Ltd.), 20 g of hydroxypropyl cellulose (HPC-L: product by Nippon Soda Co., Ltd.) and 760 g of ion-exchange water through a TK auto homomixer (by Tokushukika Co., Ltd.) at 8000 rpm. for 10 minutes, to obtain droplets having a mean particle size of 1.1 μm. These droplets were introduced into a four-necked flask of 1 l provided with a thermometer, a stirrer, a dropping funnel and a cooling tube, heated and held at 50° C. for 15 minutes, and rapidly cooled to 20° C. so that thereafter a mixture of 16.4 g of hexamethylenediamine and 80 g of ion-exchange water was dropped into the flask from the dropping funnel over 30 minutes, and the droplets were aged at the current temperature for one hour after the dropping. The droplets were filtered/washed and thereafter dried to obtain capsular particles containing 101 g of the coloring material.

PREPARATION EXAMPLE 6

Preparation of Capsular Particles of Photochromic Coloring Material (2)

Coloring material capsular particles were prepared similarly to Preparation Example 5, except that the photochromic coloring material was replaced by that expressed in the above formula (2).

PREPARATION EXAMPLE 7

Preparation of Capsular Particles of Photochromic Coloring Material (3)

Coloring material capsular particles were prepared similarly to Preparation Example 5, except that the photochromic coloring material was replaced by that having a structure expressed in the following chemical formula (3):

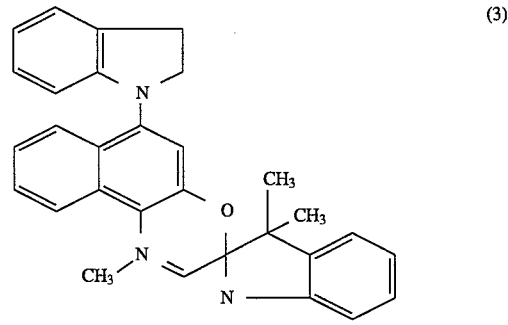

(3)

EXAMPLE 1

Preparation of Capsular Particles by Interfacial Polymerization 200 g of the pigment paste obtained in Preparation Example 1 100 g of a 10% aqueous solution of PVA (POVAR 217: product by Kuraray Co., Ltd.), 100 g of a 10% aqueous solution of PVA (POVAR 420: product by Kuraray Co., Ltd.), 40 g of a 10% aqueous solution of hydroxypropyl cellulose (HPC-L: product by Nippon Soda Co., Ltd.) and 400 g of ion-exchange water were mixed with each other and emulsified through a TK auto homomixer (by Tokushukika Co., Ltd.) at 8000 rpm for 10 minutes. This mixture was introduced into a four-necked flask of 1 l provided with a thermometer, a stirrer, a dropping funnel and a cooling tube, heated and held at 50° C. for 10 minutes and thereafter rapidly cooled to 20° C., so that a mixture of 12 g of polyamine (JEFFAMINE T-403: product by Texaco Chemical Co., Ltd.) and 200 g of ion-exchange water was dropped into the flask from the dropping funnel over 30 minutes, and the mixture was aged at the current temperature for 1 hour after the dropping. The mixture was filtered/washed and thereafter dried to obtain 102 g of capsular particles in which mica and the coloring material were composed with each other. The capsular particles as obtained were in the form of flat fine particles.

EXAMPLE 2

Preparation of Capsular Particles by Interfacial Polymerization 200 g of the pigment paste 200 g obtained in Preparation Example 2, 30 g of the polymer obtained in Preparation Example 3 and 200 g of a hydrocarbon solvent (ISOPAR E:

product by Esso Sekiyu K.K.) were mixed with each other and emulsified through a TK auto homomixer (by Tokushukika Co., Ltd.) at 800 rpm for 10 minutes. The mixture was introduced into a four-necked flask of 1 l provided with a thermometer, a stirrer, a dropping funnel and a cooling tube and held at 20° C., so that a mixture of 12 g of polyamine (JEFFAMINE T-403: product by Texaco Chemical Co., Ltd.) and 200 g of a hydrocarbon solvent (ISOPAR E: product by Esso Sekiyu K.K.) was dropped into the flask through the dropping funnel over 30 minutes, and the mixture was aged at the current temperature for 1 hour after the dropping. This mixture was filtered/washed and thereafter dried to obtain 98 g of capsular particles in which aluminum flakes and the coloring material were composed. The capsular particles as obtained were in the form of flat fine particles.

EXAMPLE 3

Preparation of Capsular Particles by Submerged Drying 200 g of polystyrene having a mean molecular weight of 270,000, 400 g of benzene, 100 g of an ultraviolet absorber (TINUVIN-123: product by Ciba-Geigy Ltd.) and 20 g of a photochromic coloring material having the structure of the above chemical formula (3) were mixed with each other and stirred through a batch-type SG bench mill (by Taihei System Co., Ltd.) for 1 hour at 1500 rpm, with addition of 1 kg of 2 mm glass beads. Thereafter the glass beads were removed by filtering, and 580 g of the mixture was weighed out and stirred in a homogenizer for 1 hour with addition of 800 g of mica (IRIODIN 111WII: product by Merck Co., Ltd.) and 200 g of ethyl acetate. 400 g of this mixture was weighed out, added into a solution prepared by 150 g of a 10% aqueous solution of PVA (POVAR 217: product by Kuraray Co., Ltd.) and 450 g of ion-exchange water, emulsified through a TK auto homomixer at 8000 rpm for 10 minutes, introduced into a four-necked flask of 1 l provided with a thermometer, a stirrer, a dropping funnel and a cooling tube, and heated to remove benzene and ethyl acetate. Then the mixture was filtered/washed and thereafter dried to obtain 250 g of capsular particles in which mica and the coloring material were composed. The capsular particles as obtained were in the form of flat fine particles.

EXAMPLES 4 AND 5

Preparation of Paint Film Containing Capsular Particles of Examples 1 and 2

Polished steel plates of 500 mm in length, 300 mm in width and 0.8 mm in thickness were employed as objects of coating. The polished steel plates were pretreated by an ordinary method with a zinc phosphate treatment agent (GRATINON SD5000: product by Nippon Paint Co., Ltd.), thereafter subjected to electrodeposition by a normal method with a cationic electrodeposition paint (POWERTOP U-30: aminated epoxy paint by Nippon Paint Co., Ltd.), and heated at 160° C. for 30 minutes to form electrodeposition paint films of 20 μm in dry thickness. Then, the electrodeposition paint films were coated with an intermediate paint (ORANO P-2 GREY: polyester-based paint by Nippon Paint Co., Ltd.) by an ordinary method and heated to 140° C. for 30 minutes, for forming intermediate paint films of 35 μm in dry thickness. These intermediate paint films were coated with base coat paints A and B of the following blending and a top coat paint (SpO-281L Clear: product by Nippon Paint Co., Ltd.) by a wet-on-wet manner, and baked at 140° C. for 30 minutes, thereby obtaining paint films of Examples 4 and 5:

Blending of Base Coat Paint A (Example 4)

encapsulated pigment prepared by composing the mica and the coloring material according to Example 1 . . . 7.37 g acrylic resin (ALMATEX NT-U-448: product by Mitsui Toatsu Chemicals, Inc.) . . . 69.50 g melamine resin (UBAN-20N-60: product by Mitsui Toatsu Chemicals, Inc.) . . . 13.90 g toluene . . . 6.63 g n-butanol . . . 2.60 g Blending of Base Coat Paint. B (Example 5)

encapsulated pigment prepared by composing the aluminum flakes and the coloring material according to Example 2 . . . 7.37 g acrylic resin (ALMATEX NT-U-448: product by Mitsui Toatsu Chemicals, Inc.) . . . 69.50 g melamine resin (UBAN-20N-60: product by Mitsui Toatsu Chemicals, Inc.) . . . 13.90 g toluene . . . 6.63 g n-butanol . . . 2.60 g

EXAMPLE 6

Preparation of Paint Film Containing Capsular Particles of Example 3

A paint film was obtained similarly to Examples 4 and 5, except that the following base coat paint C was employed:

Blending of Base Coat Paint C capsular pigment prepared by composing mica and the coloring material according to Example 3 . . . 6.92 g aqueous resin varnish obtained in Preparation Example 4 . . . 70.00 g melamine resin (CYMEL. 303: Mitsui Toatsu Chemicals, Inc.) . . . 15.00 g ion-exchange water . . . 90.00 g

COMPARATIVE EXAMPLE 1

Preparation of Paint Film Containing Capsular Particles of Preparation Example 5

A paint film was obtained similarly to Example 4, except that the following base coat paint D was employed:

Blending of Base Coat Paint D mica (IRIODIN 111WII: product by Merck Co., Ltd.) . . . 5.37 g coloring material capsules of Preparation Example 5 . . . 5.00 g acrylic resin (ALMATEX NT-U-448: product by Mitsui Toatsu Chemicals, Inc.) . . . 69.50 g melamine resin (UBAN-20N-60: product by Mitsui Toatsu Chemicals, Inc.) . . . 13.90 g toluene . . . 6.63 g n-butanol . . . 2.60 g

COMPARATIVE EXAMPLE 2

Preparation of Paint Film Containing Photochromic Coloring Material of Chemical Formula (1)

A paint film was obtained similarly to Example 4, except that the following base coat paint E was employed:

Blending of Base Coat Paint E mica (IRIODIN 111WII: product by Merck Co., Ltd.) . . . 5.37 g photochromic coloring material of chemical formula (1) . . . 0.20 g acrylic resin (ALMATEX, NT-U-448: product by Mitsui Toatsu Chemicals, Inc.) . . . 69.50 g melamine resin (UBAN-20N-60: product by Mitsui Toatsu Chemicals, Inc.) . . . 13.90 g toluene . . . 8.43 g n-butanol . . . 2.60 g

COMPARATIVE EXAMPLE 3

Preparation of Paint Film Containing Capsular Particles of Preparation Example 6

A paint film was obtained similarly to Example 5, except that the following base coat paint F was employed:

Blending of Base Coat Paint F mica (IRIODIN 111WII: product by Merck Co., Ltd.) . . . 5.37 g capsules containing coloring material of Preparation Example 6 . . . 5.00 g acrylic resin (ALMATEX NT-U-448: product by Mitsui Toatsu Chemicals, Inc.) . . . 69.50 g melamine resin (UBAN-20N-60: product by Mitsui Toatsu Chemicals, Inc.) . . . 13.90 g toluene . . . 6.63 g n-butanol . . . 2.60 g

COMPARATIVE EXAMPLE 4

Preparation of Paint Film Containing Capsular Particles of Preparation Example 7

A paint film was obtained similarly to Example 6, except that the following base coat paint G was employed:

Blending of Base Coat Paint G mica (IRIODIN 111WII: product by Merck Co., Ltd.) . . . 5.37 g capsules containing coloring material of Preparation Example 7 . . . 5.00 g acrylic resin (ALMATEX NT-U-448: product by Mitsui Toatsu Chemicals, Inc.) . . . 69.50 g melamine resin (UBAN-20N-60: product by Mitsui Toatsu Chemicals, Inc.) . . . 13.90 g toluene . . . 6.63 g n-butanol . . . 2.60 g The paint films of Examples 4 to 6 and comparative examples 1 to 4 were subjected to evaluation of film transparency, film flatness, chrominance, color change and weather resistance. The film transparency and the film smoothness were visually evaluated, while the chrominance, the color change and the weather resistance were evaluated by methods described under Table 1.

TABLE 1

| Paint Film | Example 4 | Comparative Example 1 | Comparative Example 2 | Example 5 | Comparative Example 3 | Example 6 | Comparative Example 4 |
| --- | --- | --- | --- | --- | --- | --- | --- |
| Film *4 Transparency | o | Δ | o | o | Δ | o | Δ |
| Film *4 Smoothness | o | x | o | o | x | o | x |
| Chrominance *1 | large | medium | small | large | medium | large | medium |
| Color Change *2 | unchanged | brightness reduced | brightness reduced | unchanged | brightness reduced | unchanged | brightness reduced |
| Weather *3 Resistance | at least 1 month | at least 1 month | no more than 1 week | at least 1 month | at least 1 month | at least 1 month | at least 1 month |

Note)
*1 Chrominance: Paints containing the same photochromic dyes were exposed outdoors for 10 minutes on a clear day and thereafter color differences were visually observed for evaluation.
*2 Color Change: Changes of metallic and pearly glosses were visually evaluated before and after coloring.
*3 Weather Resistance: Paint films were exposed outdoors, to measure periods up to disappearance of photochromic properties.
*4 o: good
Δ: slightly good
x: bad As clearly understood from Table 1, the paint films according to inventive Examples 4 to 6 exhibited large chrominance change with no reduction of brightness, and attained novel designing which has been impossible to attain in general.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A photochromic brightening pigment comprising:
   a brightening pigment; and
   a photochromic material being encapsulated so as to adhere it to the surface of said brightening pigment.

2. The photochromic brightening pigment of claim 1, further comprising at least one of an ultraviolet absorber and/or an antioxidant adhered to the surface of said brightening pigment with said photochromic material by said encapsulation.

3. The photochromic brightening pigment of claim 1, wherein said brightening pigment is a pigment being selected from the group consisting of aluminum flake, nickel, mica, mica coated with titanium oxide, and mica coated with iron oxide.

4. A coating composition containing the photochromic brightening pigment of claim 1.

5. A photochromic brightening pigment comprising:
   a brightening pigment;
   a resin paste, having a photochromic material dissolved or dispersed therein, said resin being mixed with said brightening pigment; and
   a capsule wall film encapsulating the mixture of said brightening pigment and said resin paste.

6. The photochromic brightening pigment of claim 5 further comprising at least one of an ultraviolet absorber and/or an antioxidant being mixed into said resin paste.

7. The photochromic brightening pigment of claim 5, wherein said brightening pigment is a pigment being selected from the group consisting of aluminum flake, nickel, mica, mica coated with titanium oxide, and mica coated with iron oxide.

8. A coating composition containing the photochromic brightening pigment of claim 5.

9. A method of preparing a photochromic brightening pigment, comprising the steps of:
   preparing a resin paste containing a photochromic material dissolved or dispersed therein;
   mixing said resin paste with a brightening pigment; and
   encapsulating said mixture.

10. The method of claim 9, wherein said mixing step is a step of mixing said resin paste, said brightening pigment and at least one of an ultraviolet absorber and/or an antioxidant with each other.

11. The method of claim 9, wherein said encapsulation is carried out by a method selected from the group consisting of interfacial polymerization, in situ polymerization, submerged curing, coacervation and submerged drying.

12. A method of preparing a paint film comprising the steps of:
   forming a base coat film of a coating composition containing the photochromic brightening pigment of claim 1; and
   applying a clear coating to said base coat film to form said paint film in the manner of 2-Coat 1-Bake.

13. A paint film containing the photochromic brightening pigment of claim 1.

* * * * *